(12) United States Patent
Ogiso et al.

(10) Patent No.: US 11,994,783 B2
(45) Date of Patent: May 28, 2024

(54) IQ OPTICAL MODULATOR

(71) Applicant: Nippon Telegraph and Telephone Corporation, Tokyo (JP)

(72) Inventors: Yoshihiro Ogiso, Musashino (JP); Josuke Ozaki, Musashino (JP); Yasuaki Hashizume, Musashino (JP); Mitsuteru Ishikawa, Musashino (JP); Nobuhiro Nunoya, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 274 days.

(21) Appl. No.: 17/640,884

(22) PCT Filed: Sep. 13, 2019

(86) PCT No.: PCT/JP2019/036098
§ 371 (c)(1),
(2) Date: Mar. 7, 2022

(87) PCT Pub. No.: WO2021/049004
PCT Pub. Date: Mar. 18, 2021

(65) Prior Publication Data
US 2022/0326585 A1 Oct. 13, 2022

(51) Int. Cl.
*G02F 1/225* (2006.01)
*G02B 6/293* (2006.01)
*G02F 1/21* (2006.01)

(52) U.S. Cl.
CPC ....... *G02F 1/2255* (2013.01); *G02B 6/29344* (2013.01); *G02F 1/212* (2021.01); *G02F 1/225* (2013.01)

(58) Field of Classification Search
CPC ......... G02F 1/212; G02F 1/217; G02B 6/125; G02B 6/2813; G02B 2006/12142
See application file for complete search history.

(56) References Cited

U.S. PATENT DOCUMENTS

| 2018/0252982 | A1 | 9/2018 | Chen et al. |
| 2018/0329269 | A1 | 11/2018 | Ward et al. |
| 2018/0335681 | A1* | 11/2018 | Adams ............... H04B 10/5053 |
| 2020/0026145 | A1 | 1/2020 | Ogiso et al. |

FOREIGN PATENT DOCUMENTS

| WO | 2017/085447 A1 | 5/2017 |
| WO | 2018/174083 A1 | 9/2018 |

* cited by examiner

*Primary Examiner* — Michelle R Connelly
*Assistant Examiner* — Kirsten D. Endresen
(74) *Attorney, Agent, or Firm* — Workman Nydegger

(57) ABSTRACT

Provided is an IQ optical modulator including a nest-type MZ optical waveguide having optical modulation regions of I channel and Q channel End portions of an input optical waveguide and an output optical waveguide of the IQ optical modulator are located on a same edge face of a chip of the IQ optical modulator, an optical cross waveguide is included in which an optical waveguide between a first optical combiner and a second optical combiner of the nest-type MZ optical waveguide and the input optical waveguide cross each other, a first optical divider is provided between the I-channel optical modulation region and the Q-channel optical modulation region, and a light propagation direction in the first optical divider and a light propagation direction in the optical modulation regions are opposite to each other.

7 Claims, 15 Drawing Sheets

Fig. 4
(a)
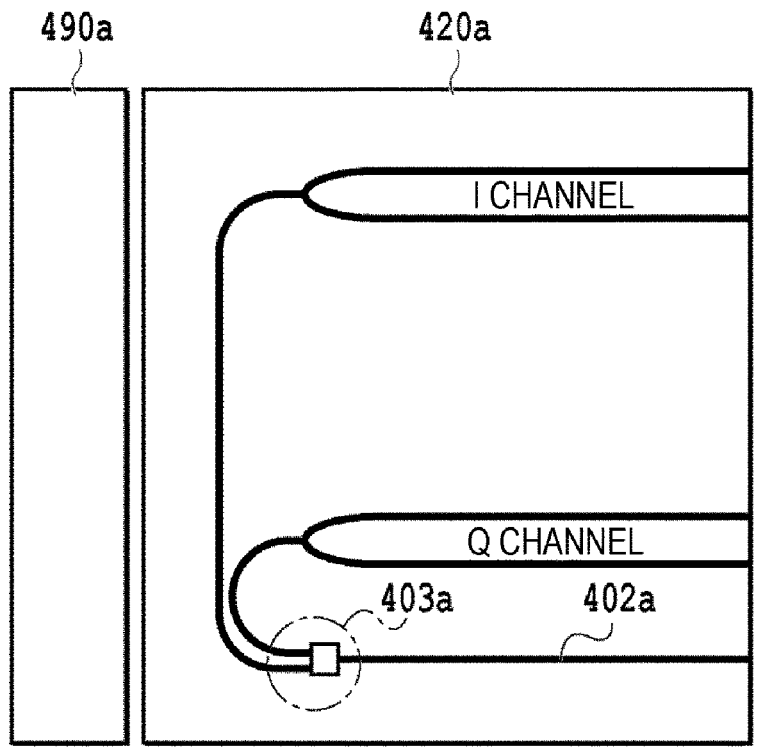
(b)
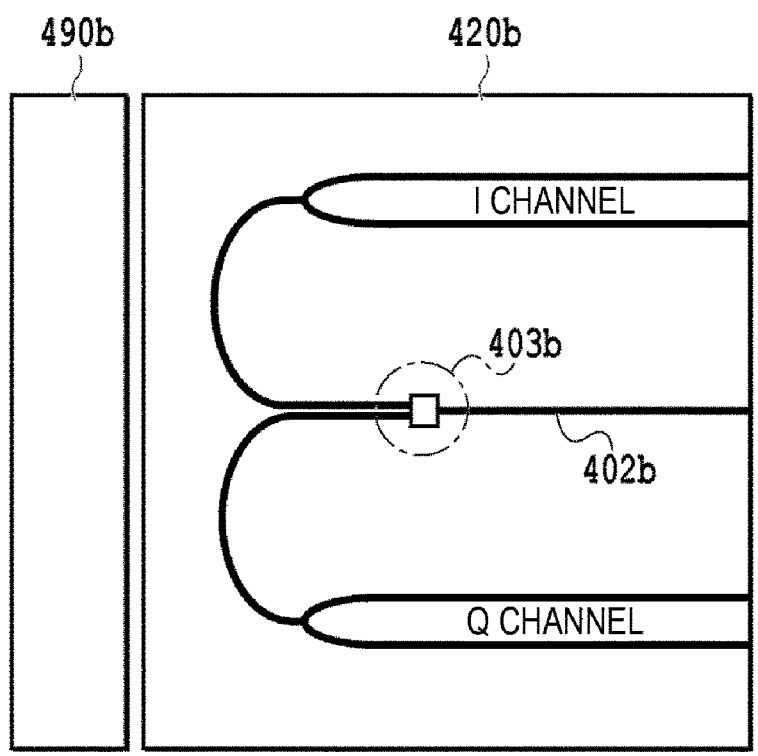

Fig. 15
(a)
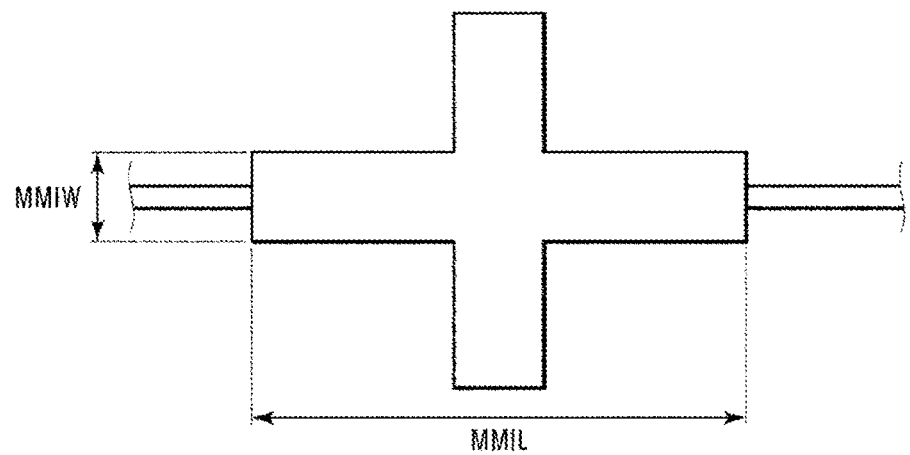
(b)
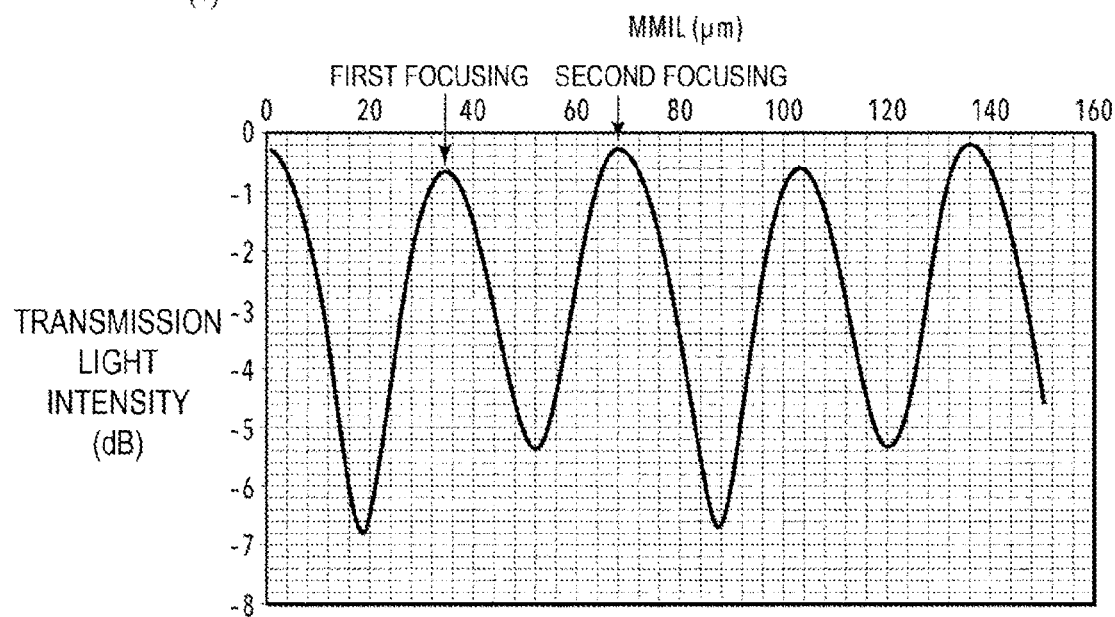

IQ OPTICAL MODULATOR

TECHNICAL FIELD

The present disclosure relates to an IQ optical modulator capable of high speed and wide wavelength band operation.

BACKGROUND ART

With the increased capacity of optical communication systems, high-speed optical modulators supporting advanced optical modulation schemes are required. In particular, multilevel optical modulators using digital coherent technologies play a major role in enabling high-capacity transceivers having a capacity over 100 Gbps. In these multilevel optical modulators, in order to add independent signals to the amplitude and phase of light, optical modulators (MZM) capable of zero-chirp drive are built in parallel in multiple stages, and the optical modulators (MZM) includes a Mach-Zehnder interference-type optical waveguide (MZ optical waveguide) which divides an optical input into two arms, and then combines and interference-outputs these divided lights after phase shift.

A typical polarization-multiplexed IQ optical modulator that is currently becoming widespread in communication networks is composed of an MZM including total four child MZMs (Quad-parallel MZM) in which two so-called nest-type MZ optical waveguides in which each arm of a parent MZM is composed of a child MZM are provided in correspondence with the X and Y polarization channels. In two arms of each child MZM, a traveling-wave electrode is employed for modulating RF signals into optical signal which propagates on the optical waveguide. In each polarization channel, one of such paired two child MZMs is an I channel and the other is a Q channel.

In such a polarization-multiplexed IQ optical modulator, an RF modulated signal is input to one end of a modulation electrode provided along the optical waveguide of the child MZM arm to modulate optical phase propagating the MZM waveguides by electro-optical effects. Patent Literature 1.

Further, although a polarization-multiplexed IQ optical modulator is one of IQ optical modulators, optical signals used in the IQ optical modulator are not limited to two polarization optical signals, and an IQ optical modulator using a single polarization optical signal is known. In the case of single polarization, one nest-type MZM is used.

FIG. 1 is a plan view of an example of a polarization-multiplexed IQ optical modulator 100 with a structure in the related art.

Input light 101 input from the center of the right end of a chip 120 of the polarization-multiplexed IQ optical modulator 100 in FIG. 1 is divided by a light branch circuit 103 on a left end of the chip via an input optical waveguide 102 passing between nest-type MZMs 104X and 104Y for two (X and Y) polarization channels. After dividing, the two lightwaves turned back 180° are input into the nest-type MZM 104X for the X polarization channel and the nest-type MZM 104Y for the Y polarization channel. In the nest-type MZM 104X and the nest-type MZM 104Y, the lightwaves of polarization channels are optically modulated by eight RF modulation signals 108 input from the chip left end and output as modulated output light 110X and 110Y from the top and bottom of the chip right end.

FIG. 2 is a plan view of another example of the polarization-multiplexed IQ optical modulator 200 of the similar structure in the related art. FIG. 3 is a plan view illustrating a specific layout on the chip of FIG. 2. (PTL 2, FIG. 7)

The two structures in the related art in FIGS. 1 and 2 are common in that an input optical waveguide 202 is provided between the X polarization channel and the Y polarization channel, but in the polarization-multiplexed IQ optical modulator 200 of FIG. 2, the structure of a light branch circuit 203 is different from that of FIG. 1. The light branch circuit 103 is symmetric between the IQ channels in FIG. 1, but the light branch circuit 103 is asymmetric between the IQ channels in FIG. 2.

In FIG. 1, since the waveguide structure is symmetric between the IQ channels, the characteristic error between the channels is small with respect to temperature fluctuation and temperature distribution within the chip, but there is a concern for degradation of high-frequency characteristics because a longer RF feed line L1 is required for RF modulation. On the other hand, although, the structure of FIG. 2 has an advantage of shortening a feedline length L2 of the RF-modulated signal input, the structure has a problem with temperature fluctuation and long-term stability due to an asymmetric waveguide structure between the IQ channels.

FIG. 4 is a diagram illustrating the importance of a symmetric waveguide structure between the IQ channels. In the structure of FIG. 4(a), on the chip 420a, light input from the right end side of the chip propagates leftward in the input optical waveguide 402a provided below the Q channel, and the light is turned by 180° after dividing by the light branch circuit 403a and input to the MZMs of both IQ channels. Thus, assuming that the length of the optical waveguide is asymmetrical between IQ channels by the amount corresponding to the channel pitch, and a heat source 490a from a package or the like is provided on the left side of the chip 420a, there is a concern that a phase difference between the lightwaves of both IQ channels fluctuates in the vicinity of the chip end, when the thermal distribution changes due to the influence of the outside environmental temperature or the like.

On the other hand, as in the structure of the chip 420b in FIG. 4(b), when an input optical waveguide 402b can be provided between the I and Q channels, the optical waveguide can have a symmetrical structure in which after light is divided by the light branch circuit 403b, the two divided lightwaves can be bent symmetrically and divided/input into the MZMs of the IQ channels. With this structure, when the interval between the I channel, the Q channel, and the input optical waveguide 402b is appropriately (equally) designed, the effects of thermal distribution changes due to the heat source 490b from the outside of the package or the like can be suppressed equally between both IQ channels, and it is possible to suppress light phase fluctuation in the vicinity of the chip end. As described above, the symmetric structure of the optical waveguide is required at the time of optical dividing and bending. However, in an IQ optical modulator having a nest-type MZ optical waveguide, the region between the I and Q channels is surrounded by a divider, a combiner, and an arm (a child MZM) of the parent MZM, so that a crossing part between the optical waveguides is required in order to draw the input optical waveguide into this region, which is a problem as a cause of optical loss.

FIG. 5 is a plan view of yet another example of the polarization-multiplexed IQ optical modulator of a structure in the related art.

(PTL 2, FIG. 6)

In FIG. 5, the input light is divided on the input side of the chip, and the two optical input waveguides are provided outside the optical modulation regions (all channels). With this structure, since functional circuits such as a phase adjuster or an optical amplifier can be provided outside the chip, there is an advantage of achieving independence from high-frequency characteristics. However, even in this structure, similar to the structure in the related art of FIG. 2, there remains a problem in operational stability due to the asymmetry of the waveguide structure between IQ channels.

CITATION LIST

Patent Literature

PTL 1: WO 2018/174083
PTL 2: WO 2017/085447

SUMMARY OF THE INVENTION

Technical Problem

In the structure in the related art as described above, the input optical waveguide is disposed between the X and Y polarization channels, but when the waveguide structure is designed to be symmetric between IQ channels of each of the X and Y polarization channels, the RF input lead-in line length L1 becomes longer as in FIG. 1, resulting in degradation of high-frequency characteristics.

On the other hand, when the RF feeder line length L2 is designed to be short, as in the example in the related art of FIGS. 2 and 3, the waveguide structure is asymmetric between the IQ channels, and the characteristic difference between the channels is greatly dependent on the temperature.

On the other hand, when the optical input waveguide is provided outside the optical modulation region as illustrated in FIG. 5, independently of the high-frequency characteristics, there is an advantage that a functional circuit such as an optical amplifier and a phase modulator can be designed. However, there is a problem with the operational stability due to the asymmetry of the waveguide structure between IQ channels.

Means for Solving the Problem

In order to solve this problem, the present disclosure provides an optical input waveguide between IQ channels via an optical cross waveguide where lightwaves cross each other on the same plane. The optical cross waveguide has a configuration in which 1×1 MMI couplers are orthogonal to each other, and functions as a higher-order mode filter for lightwave.

Embodiments have, for example, the following configurations.

Configuration 1

An IQ optical modulator, comprising a nest-type MZ optical waveguide including an I-channel optical modulation region and a Q-channel optical modulation region, wherein:
an end portion of an input optical waveguide and an end portion an output optical waveguide of the IQ optical modulator are located on a same edge face of a chip of the IQ optical modulator;
the input optical waveguide and an optical waveguide connecting a first optical combiner configured to combine output light from one channel of the I-channel optical modulation region and the Q-channel optical modulation region and a second optical combiner connected to the output optical waveguide cross each other at an optical cross waveguide where light crosses on a same plane;
a first optical divider connected to the input optical waveguide is provided between the I-channel optical modulation region and the Q-channel optical modulation region; and
a light propagation direction in the first optical divider and a light propagation direction in the I-channel optical modulation region and the Q-channel optical modulation region are opposite to each other.

Configuration 2

In the IQ optical modulator according to Configuration 1,
a second optical divider configured to split light that has been divided by the first optical divider into two arms of the I-channel optical modulation region and the Q-channel optical modulation region is provided between the I-channel optical modulation region and the Q-channel optical modulation region, and
a light propagation direction in the second optical divider and a light propagation direction in the I-channel optical modulation region and the Q-channel optical modulation region are opposite to each other.

Configuration 3

In the IQ optical modulator according to Configuration 1 or 2,
a dummy optical cross waveguide that does not supply crossing light is provided on the other channel side not crossing the input optical waveguide.

Configuration 4

In the IQ optical modulator according to any one of Configurations 1 to 3, the optical cross waveguide includes two 1×1 MMI couplers disposed in a cross shape in which the light propagation directions are orthogonal to each other.

Configuration 5

In the IQ optical modulator according to Configuration 4, the two 1×1 MMI couplers cross at a second focusing point in a propagation mode of crossing light.

Configuration 6

A polarization-multiplexed IQ optical modulator in which two IQ optical modulators according to any one of Configuration 1 to 5 are integrated in parallel on a chip for an X-polarization channel and a Y-polarization channel, the polarization-multiplexed IQ optical modulator comprising an XY polarization divider provided to divided light input from an input optical waveguide into an X-polarization channel and a Y-polarization channel to supply the divided light to two IQ optical modulators.

Configuration 7

In the polarization-multiplexed IQ optical modulator according to Configuration 6, the XY polarization divider includes a 1-input 2-output optical divider, a DC phase adjuster, and a 2-input 2-output optical combiner/divider.

Effects of the Invention

With such a configuration, the optical waveguide structure is a symmetrical structure between the IQ channels, and therefore, a difference in characteristics between IQ channels due to temperature fluctuations can be suppressed. Since an RF feeder line length can be reduced, the high-frequency characteristics of the IQ optical modulator improves.

BRIEF DESCRIPTION OF DRAWINGS

FIG. 4 is a diagram illustrating the symmetry of a waveguide structure between IQ channels.

FIG. 15 is a chip plan view (a) of the optical cross waveguide according to Example 6, and a graph (b) illustrating transmission light intensity.

DESCRIPTION OF EMBODIMENTS

Hereinafter, examples of the present disclosure will be described in detail.

Example 1

Figure 1:
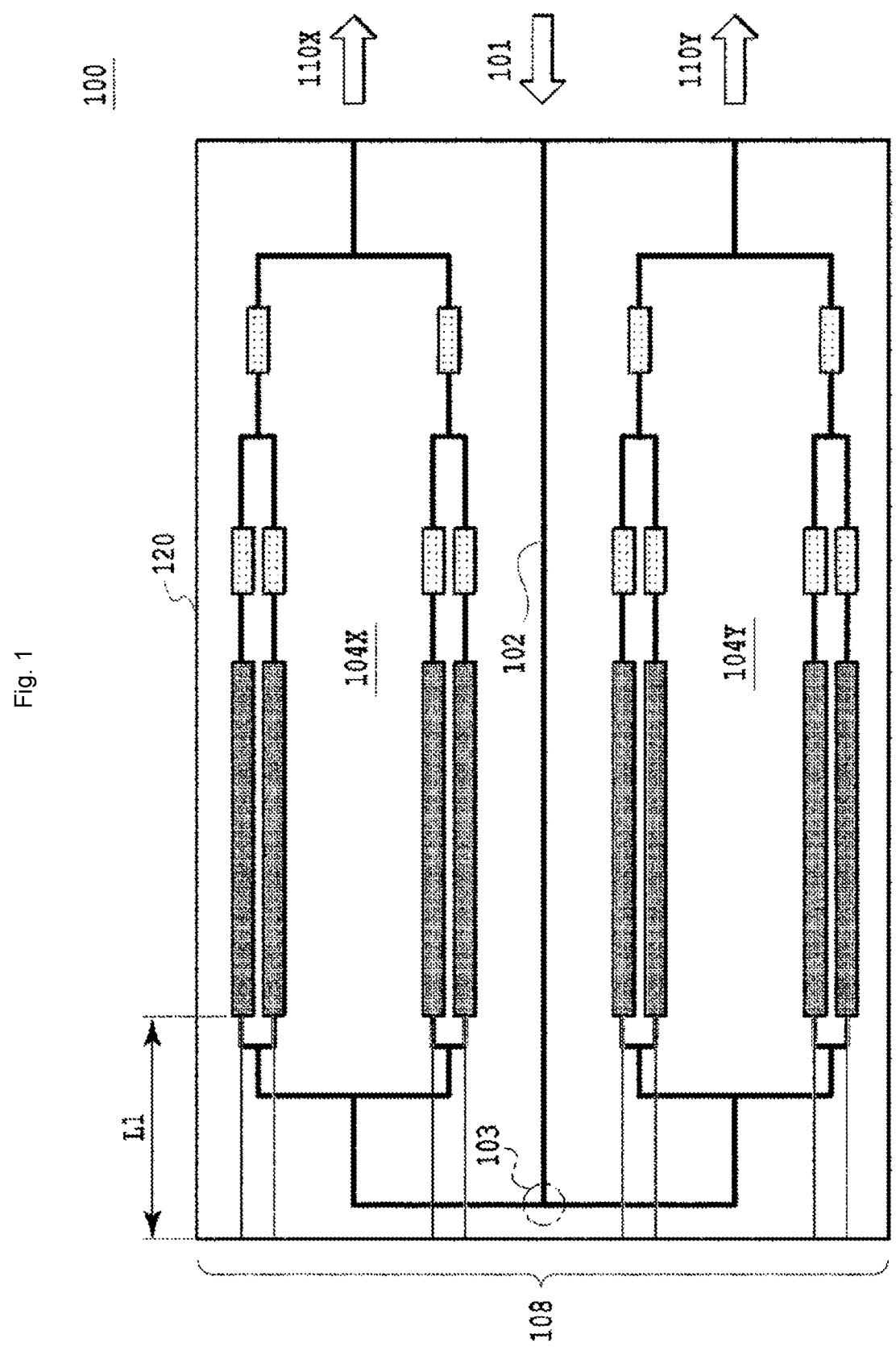
FIG. 1 is a plan view illustrating an example of a polarization-multiplexed IQ optical modulator of a structure in the related art.
Figure 2:
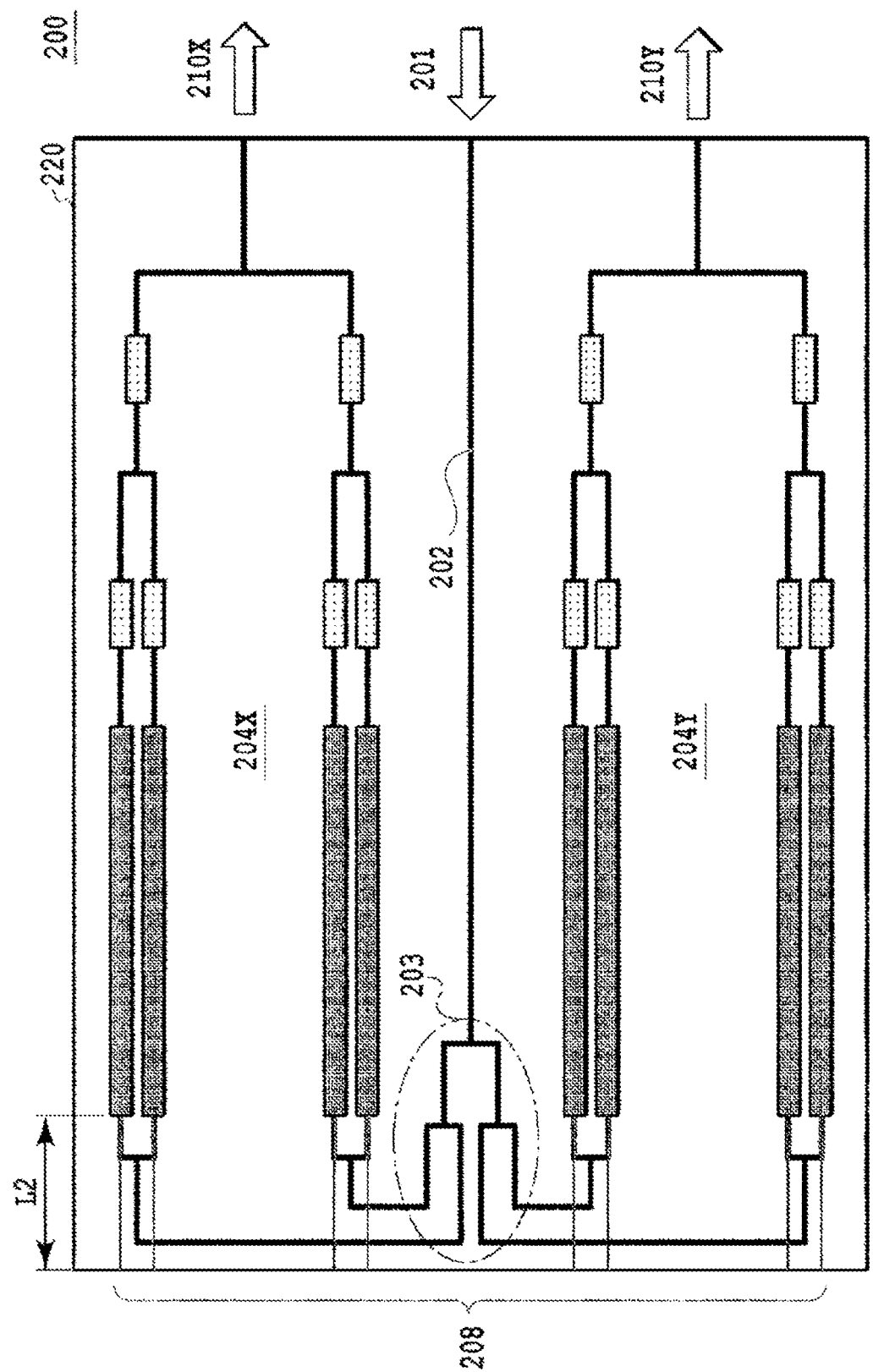
FIG. 2 is a plan view illustrating another example of the polarization-multiplexed IQ optical modulator of the structure in the related art.
Figure 3:
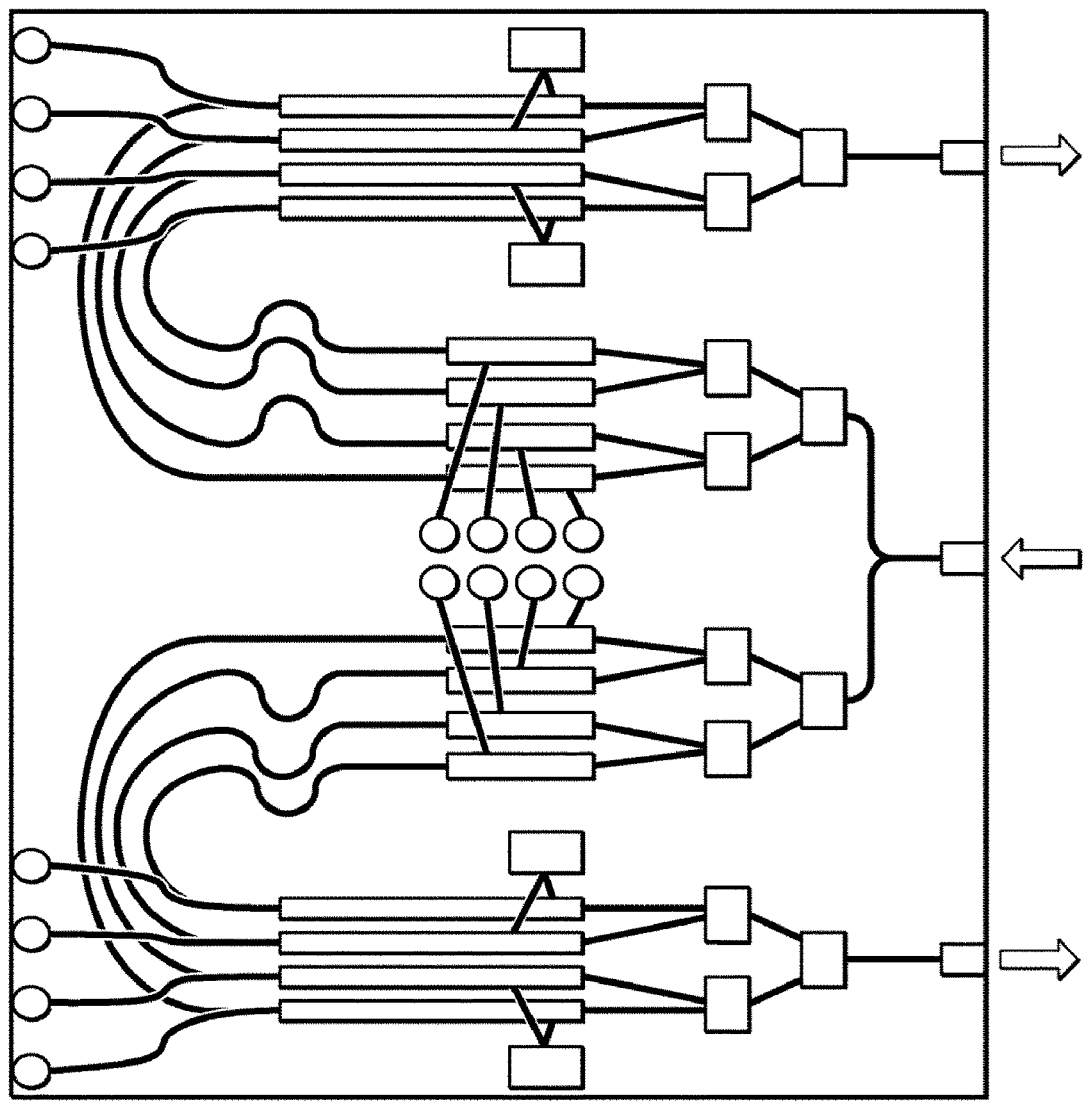
FIG. 3 is a plan view illustrating a specific layout on a chip illustrated in FIG. 2.
Figure 5:
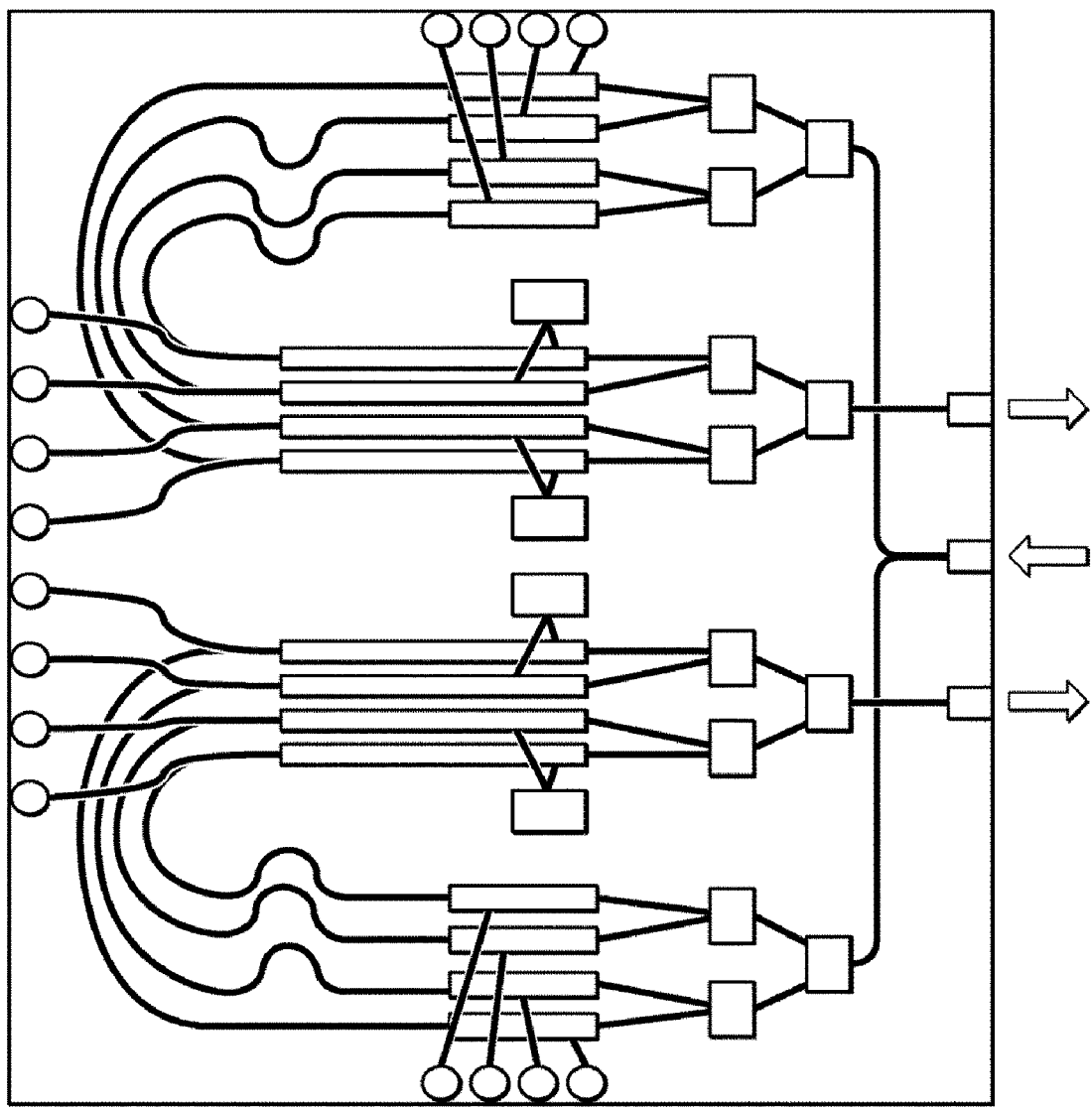
FIG. 5 is a plan view illustrating yet another example of the polarization-multiplexed IQ optical modulator of a structure in the related art.
Figure 6:
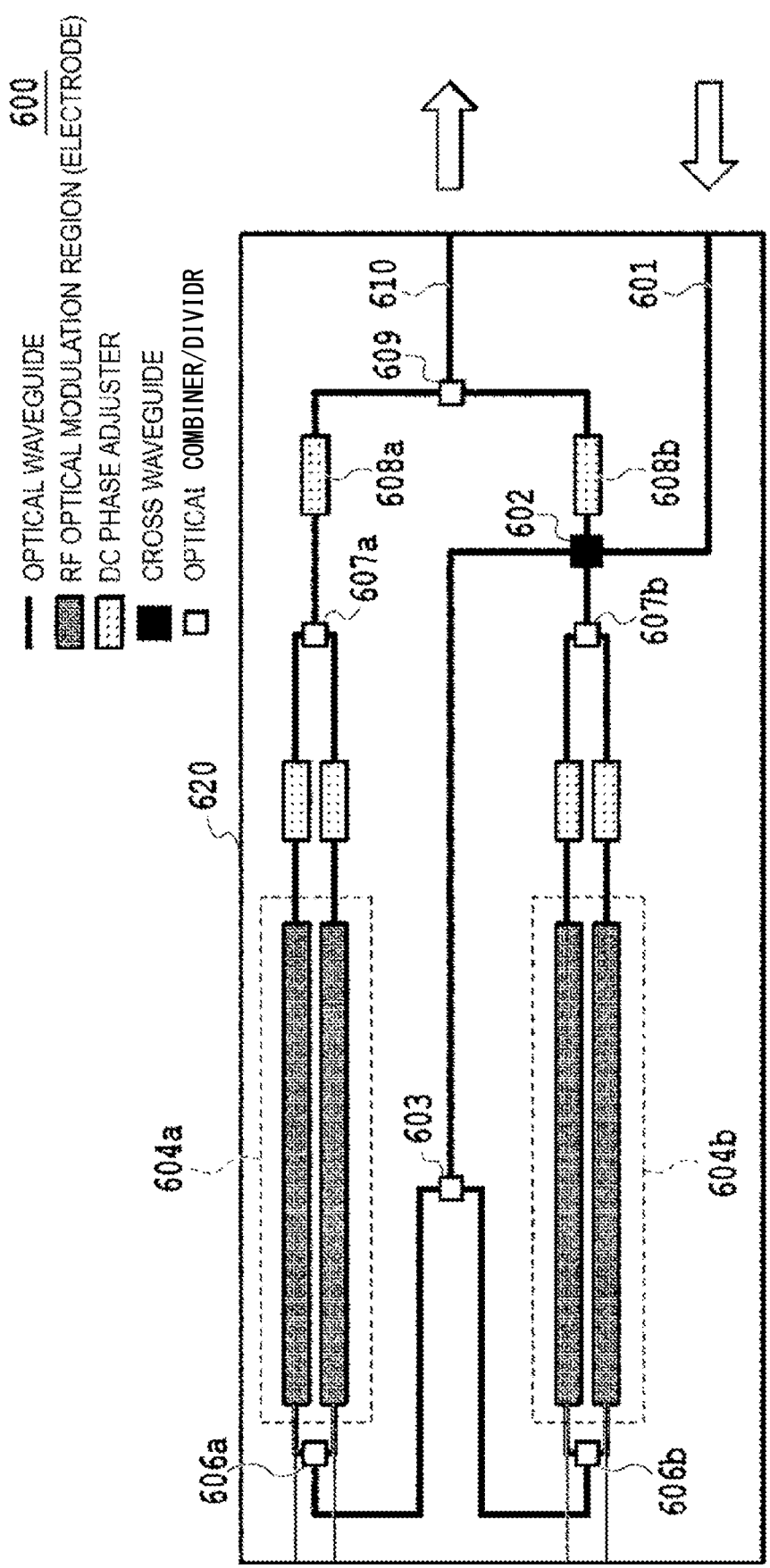
FIG. 6 is a chip plan view of the IQ optical modulator according to Example 1.

FIG. 6 is a chip plan view of an IQ optical modulator according to Example 1. The IQ optical modulator 600 of Example 1 is a single-polarization IQ optical modulator that has an I-channel optical modulation region 604a and a Q-channel optical modulation region 604b that form child MZMs of a single nest-type MZM on the chip 620.

The IQ optical modulator 600 of FIG. 6 is an IQ optical modulator including a nest-type MZ optical waveguide that forms the I channel optical modulation region 604a and the Q channel optical modulation region 604b as a child MZM. The end portions of the input optical waveguide 601 of the light input part and the output optical waveguide 610 of the light output part are located on the same edge face (right edge face in FIG. 6) of the chip 620.

On the other hand, an optical waveguide connecting a first optical combiner 607b that is an optical combiner of a child MZM, for example, on the Q-channel side, and a second optical combiner 609 that is an optical combiner of a parent MZM crosses the input optical waveguide 601, the crossing part is provided with an optical cross waveguide 602 in which lightwaves cross each other on the same plane, and the input optical waveguide 601 is drawn into the region between the I channel and the Q channel.

In the case of FIG. 6, the optical cross waveguide 602 is provided on the Q-channel side, but the input optical waveguide 601 may be disposed above the output optical waveguide 610 in FIG. 6 to make lightwaves cross on the I-channel side.

The first optical divider 603, which is the optical divider of the parent MZM, is provided between the I-channel optical modulation region 604a and the Q-channel optical modulation region 604b, and the light propagation direction in the first optical divider 603 and the light propagation direction in the optical modulation regions 604a and 604b are opposite (180°).

The second optical dividers 606a and 606b, which are optical dividers of the child MZMs, are provided on the input side of the I-channel optical modulation region 604a and the Q-channel optical modulation region 604b which are the destinations where the two lightwaves divided by the first optical divider 603 are turned back. The second optical dividers 606a and 606b need not be provided between the I-channel optical modulation region 604a and the Q-channel optical modulation region 604b. For the second optical dividers 606a and 606b, the light propagation direction in the second optical dividers 606a and 606b and the light propagation direction in the optical modulation regions 604a and 604b need not be opposite.

Note that DC phase adjusters 608a and 608b are provided on the input side of the second optical combiner 609 in the waveguide of the parent MZM, but the DC phase adjusters 608a and 608b may be provided, for example, on the optical waveguide from the output side of the first optical divider 603 to the input side of the second optical dividers 606a and 606b.

With such a configuration, the optical waveguide structure is symmetric between the modulation regions of the IQ channels, so that a difference in characteristics between IQ channels due to temperature fluctuations can be suppressed.

Example 2

Figure 7:
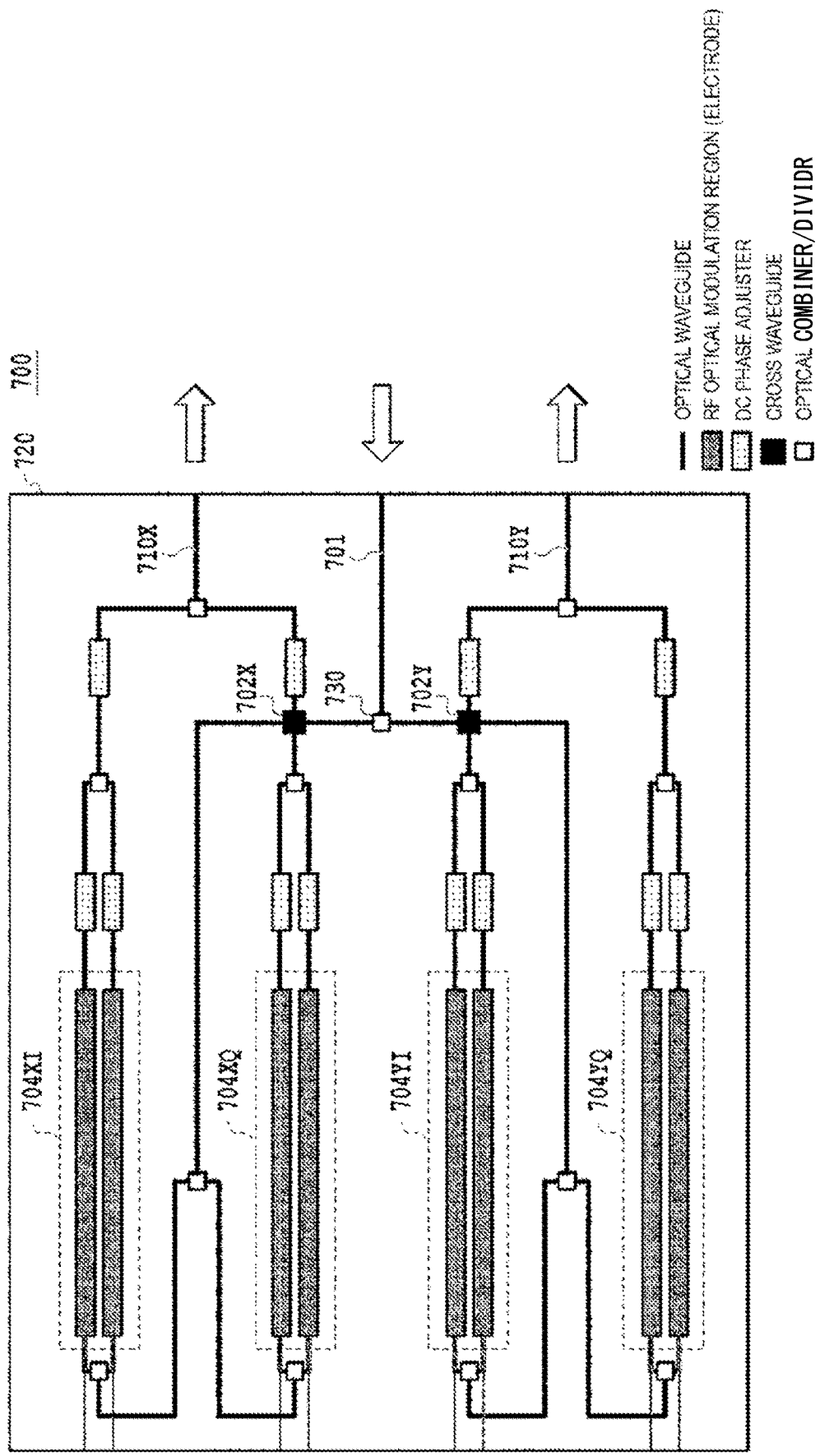
FIG. 7 is a chip plan view of the polarization-multiplexed IQ optical modulator according to Example 2.

An IQ optical modulator 700 of Example 2 illustrated in FIG. 7 is a polarization-multiplexed IQ optical modulator in which the two IQ optical modulators 600 of Example 1 are integrated in parallel on the chip 720 for X and Y polarization channels to form a polarization-multiplexed IQ optical modulator. The configuration in which total four MZ modulators are integrated on the chip 720 is used in actual polarization-combined systems.

In the polarization-multiplexed IQ optical modulator 700 of FIG. 7, light input from the input optical waveguide 701 is divided by an XY polarization divider 730 into X and Y polarization channels, and via the optical cross waveguides 702X and 702Y, the light is drawn between the IQ channel optical modulation regions 704XI and 704XQ or 704YI and 704YQ of each polarization channel, and thereafter the light is divided, folded back, and modulated. The modulated light is then combined by each polarization channel, and finally output as X-polarization modulated output light and Y-polarization modulated output light, from the output optical waveguides 710X and 710Y connected to the same chip edge face as the input optical waveguide 701.

Example 3

Figure 8:
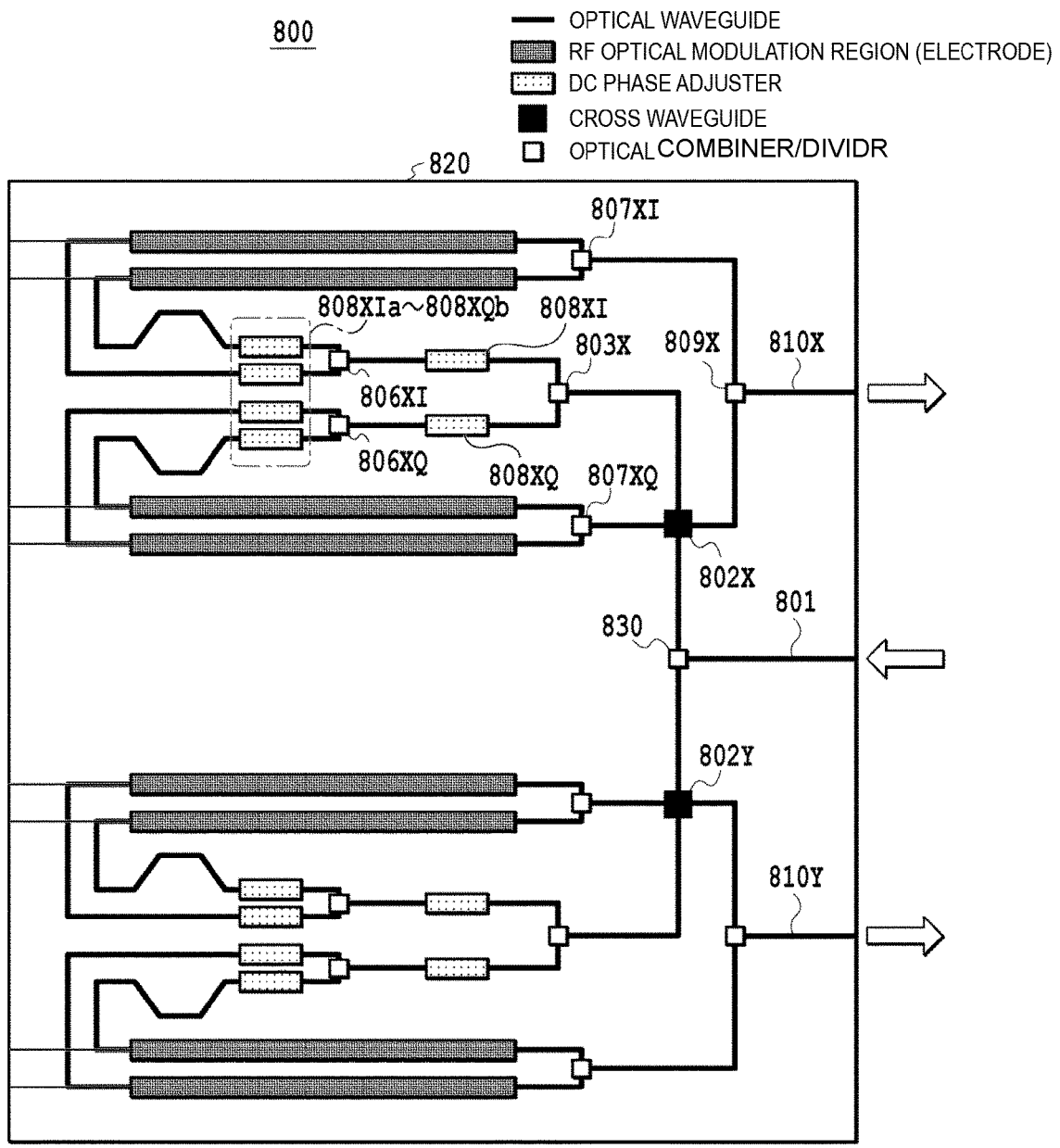
FIG. 8 is a chip plan view of the polarization-multiplexed IQ optical modulator according to Example 3.

FIG. 8 illustrates a polarization-multiplexed IQ optical modulator 800 according to Example 3. The IQ optical modulator 800 according to Example 3, in the configuration of the polarization-multiplexed IQ optical modulator 700 according to Example 2, the second optical dividers 806XI and 806XQ (with respect to the Y-polarization side, element symbols in FIG. 8 are omitted) that are the optical dividers of the child MZMs are also provided between the I-channel optical modulation region and the Q-channel optical modulation region, and the light propagation direction in the second optical dividers and the light propagation direction in the optical modulation regions are opposite (180°).

With the configuration according to Example 3, the DC phase adjusters 808XIa, 808XQa, 808XIb, and 808XQb (with respect to the Y-polarization side, element symbols in FIG. 8 are omitted) provided in the waveguides of the child MZMs can be formed before the turning position, so that the DC phase adjusters may not be formed in series with the RF electrode of the optical modulation region, which makes it possible to shorten the chip length and miniaturize the chip.

Note that, in the case of FIG. 8, the DC phase adjusters 808XI and 808XQ of the parent MZM are provided between the first optical divider 803 and the second optical divider 806, but may be provided between the first optical combiner 807 and the second optical combiner 809.

Further, in FIG. 8, after the second optical dividers 806XI and 806XQ, which are optical dividers of the child MZMs, split light toward each arm of the child MZMs, the light divided in each of the two optical waveguides turns back together, so that the optical waveguide corresponding to the inner (inward) arm of the two arms of the child MZMs is provided with a bent part for making the optical path length the same as that of the outer (outward) arm.

Example 4

Figure 9:
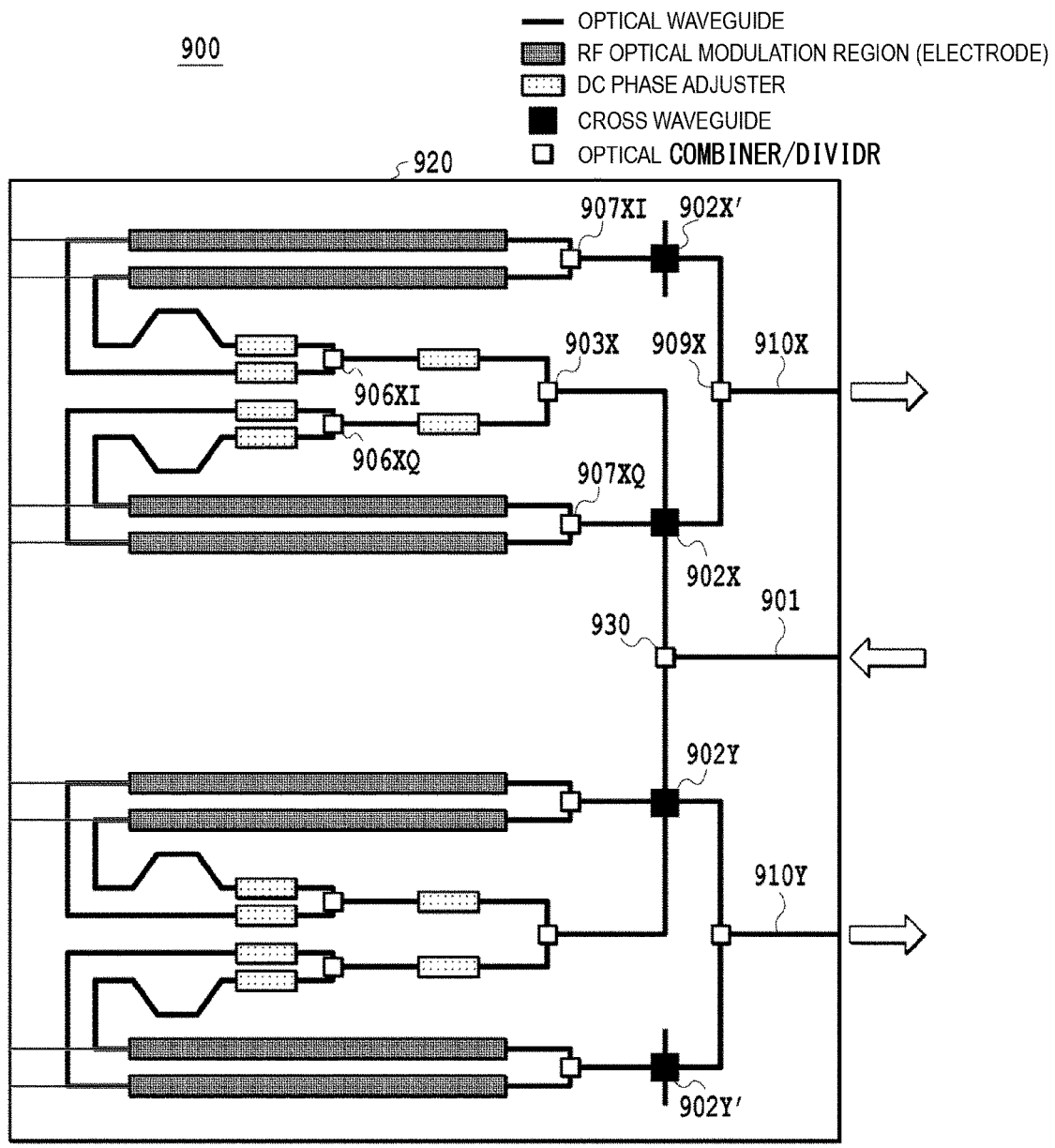
FIG. 9 is a chip plan view of the polarization-multiplexed IQ optical modulator according to Example 4.

FIG. 9 is a chip plan view of a polarization-multiplexed IQ optical modulator 900 according to Example 4. Each element having no symbols in the drawings or having a common number after the second digit is the same element as the corresponding element in the previous drawings, and the description thereof will be omitted.

The polarization-multiplexed IQ optical modulator 900 according to Example 4 in FIG. 9 is provided with optical cross waveguides that do not supply crossing light even to a channel that does not have crossing optical waveguide, that is, dummy optical cross waveguides 902X' and 902Y', in addition to the configurations of Examples 1 to 3.

With such a configuration, the number of waveguide crossings between the XY and IQ channels becomes equal, so that the difference in optical characteristics between the channels can be eliminated.

Example 5

Figure 10:
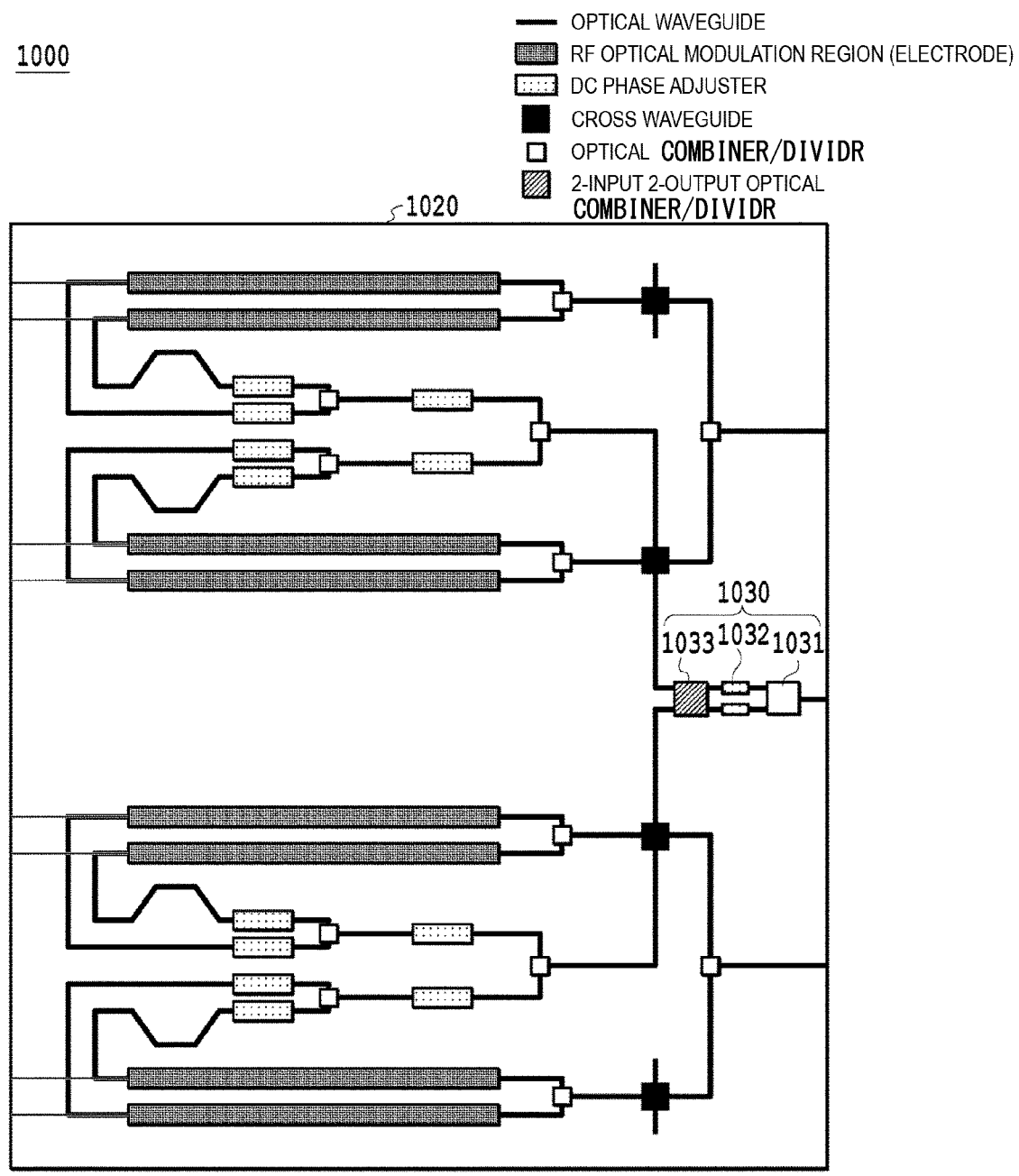
FIG. 10 is a chip plan view of the polarization-multiplexed IQ optical modulator according to Example 5.

FIG. 10 is a chip plan view of a polarization-multiplexed IQ optical modulator 1000 according to Example 5.

The polarization-multiplexed IQ optical modulator 1000 according to Example 5 in FIG. 10 has a configuration in which, in addition to the configurations of Examples 2 to 4, a 1-input 2-output optical divider 1031, a DC phase adjuster 1032, and a 2-input 2-output optical combiner/divider 1033 are connected in this order in the XY polarization divider 1030.

The specification of the difference in optical insertion loss between X-polarization and Y-polarization channels is defined as polarization dependent loss (PDL), and the problem is that the PDL of the polarization-multiplexed IQ optical modulator increases due to non-uniformity caused by a processing process or the like.

In the related art, a variable optical attenuator (VOA) has been used for each polarization channel as a compensation mechanism for the PDL, but in the VOA compensation mechanism, the balance is adjusted by attenuating the light intensity of the channel with high light power intensity by VOA, so that in principle, excessive light loss has occurred.

In Example 5, since the XY polarization divider 1030 is formed such that the 1-input 2-output optical divider 1031, the DC phase adjuster 1032, and the 2-input 2-output optical combiner/divider 1033 are connected in this order, an optical power trimming mechanism capable of arbitrary adjusting the branching ratio as an XY polarization divider is formed in the first stage. Thus, there is a great advantage that PDL compensation can be performed while maintaining total light intensity without loss.

Example 6

Figure 11:
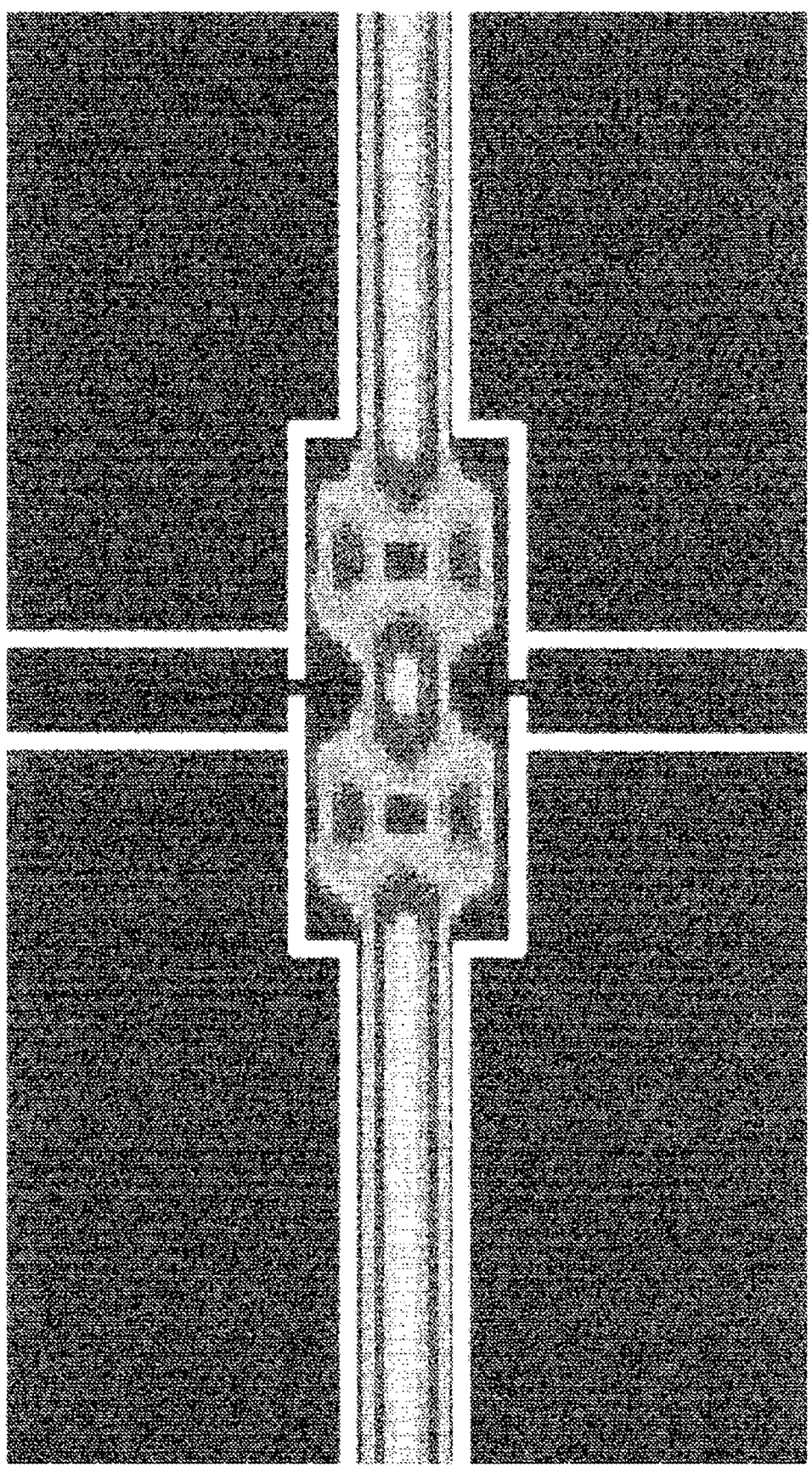
FIG. 11 is a distribution diagram of a light propagation mode for describing an optical cross waveguide of the IQ optical modulator according to Example 6.

FIG. 11 is a distribution diagram of a light propagation mode for describing an optical cross waveguide of an IQ optical modulator as Example 6. The optical cross waveguide of Example 6 includes two 1×1 MMI couplers disposed in a cross shape orthogonal to a light propagation direction. The two 1×1 MMI couplers have a cross-shaped plane shape, are formed with the same core cladding structure, and have a structure in which two lightwaves of which propagation directions are orthogonal cross on the same plane.

In FIG. 11, the light propagating horizontally through the optical waveguide in the horizontal (longitudinal) direction of FIG. 11 shows the light intensity distribution corresponding to a propagation mode, that is formed in a central rectangular MMI part that becomes a horizontal bar of the cross structure. In this case, no light propagates in the vertical direction that crosses at the center. Any of the optical cross waveguides of Examples 1 to 5 may be configured by using two 1×1 MMI couplers disposed in a cross shape.

Since the 1×1 MMI couplers function as a high-order mode filter for light, it is important to obtain wide-band optical characteristics, and the focusing positions (the constricted part of the light intensity distribution) in the MMI couplers are set to a crossing part of light, so that a further low-loss optical cross waveguide can be achieved.

In particular, by combining the focusing positions of the two MMI couplers to form an optical cross waveguide, the influence on the propagating light of the optical cross waveguide can be minimized, and low-loss optical characteristics can be obtained.

Figure 12:
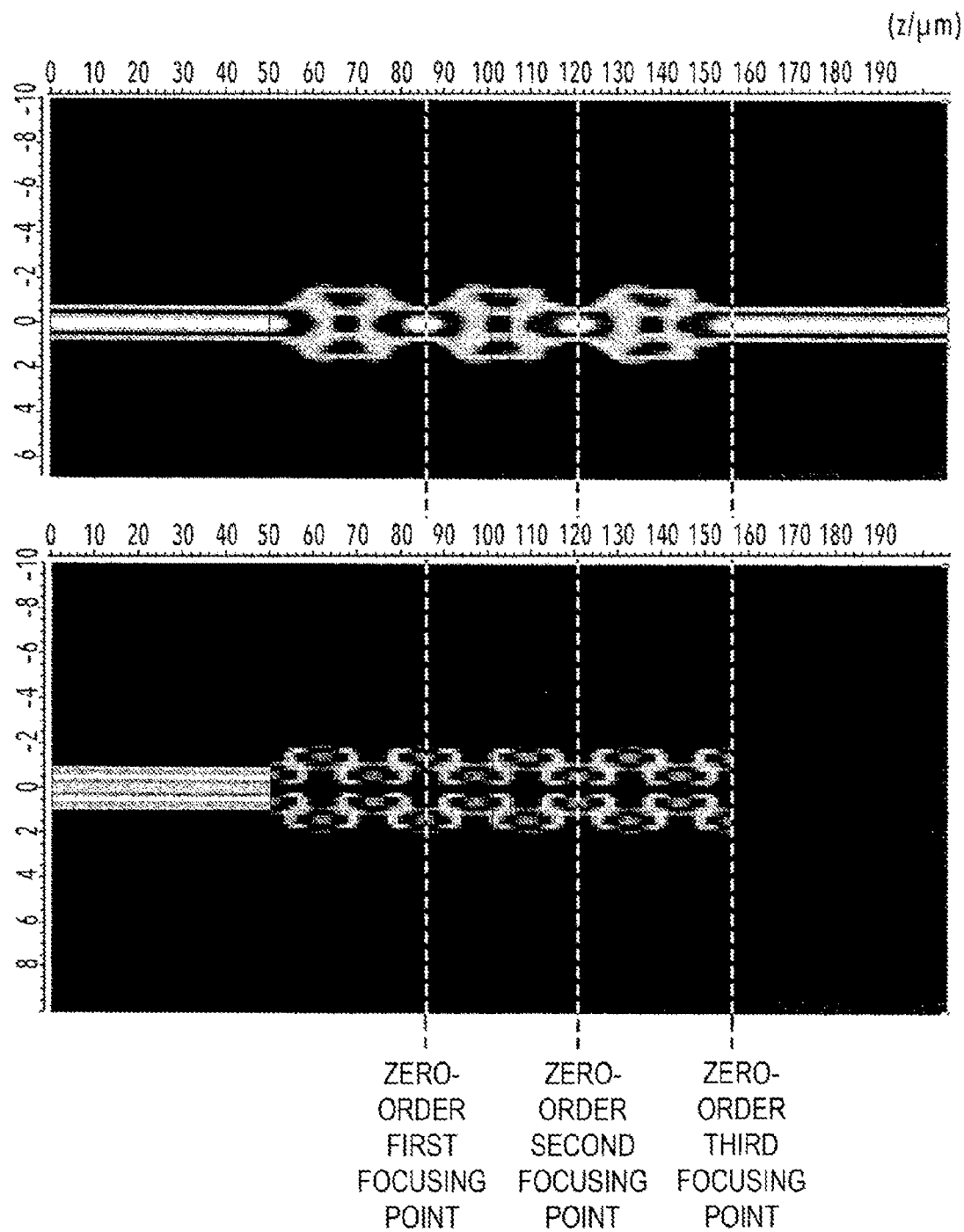
FIG. 12 is a diagram for describing a distribution of light intensity of light propagating in a 1×1 MMI coupler in a zero-order mode and a primary mode.

FIG. 12 is a diagram for comparing and describing the light intensity distributions of light propagating in the horizontal direction in one 1×1 MMI coupler in a zero-order mode and a primary mode. In FIG. 12, the top diagram is a distribution diagram in the zero-order mode and shows the distribution of 3 cycles of light incident from the left waveguide in the longitudinal direction (MMI length, horizontal axis) of the MMI. The bottom diagram in FIG. 12 is a distribution diagram in the primary mode and shows the distribution of 4.5 cycles in the same section of the waveguide in the longitudinal direction (horizontal axis).

When an optical cross waveguide is formed on an MMI coupler, in the focusing point in the zero-order mode, the zero-order mode is not affected by crossing, and the propagation loss in the optical cross waveguide can be suppressed. The three vertical dotted lines connecting the top and bottom diagrams in FIG. 12 indicate the positions of the first to third focusing points in the zero-order mode in the horizontal axis direction.

Since the first focusing point in the zero-order mode is different from the focusing point in the first-order mode, when the MMI coupler is formed at the first focusing point (when the MMI coupler length is the leftmost vertical dotted line), the zero-order mode light is coupled to the optical waveguide following the MMI coupler, but the first-order mode light is not coupled to the optical waveguide, and the MMI coupler functions as a first-order mode filter. In this case, when attempting to form an optical cross waveguide, it is not possible to form the optical cross waveguide on the focusing point in zero-order mode, so that the loss of the optical cross waveguide becomes large.

On the other hand, when the MMI coupler is configured at the second focusing point in the zero-order mode (when the MMI coupler length is the second vertical dotted line from the left), since the focusing point in the first-order mode matches the focusing point in the zero-order mode at the MMI coupler outlet, both the zero-order mode and the first-order mode are coupled to the optical waveguide following the MMI coupler, and the propagation loss can be suppressed. On the other hand, the MMI coupler has no function as a first-order mode filter. However, since the optical cross waveguide can be formed on the first focusing point of zero-order mode, it is possible to reduce the loss of the optical cross waveguide.

Figure 13:
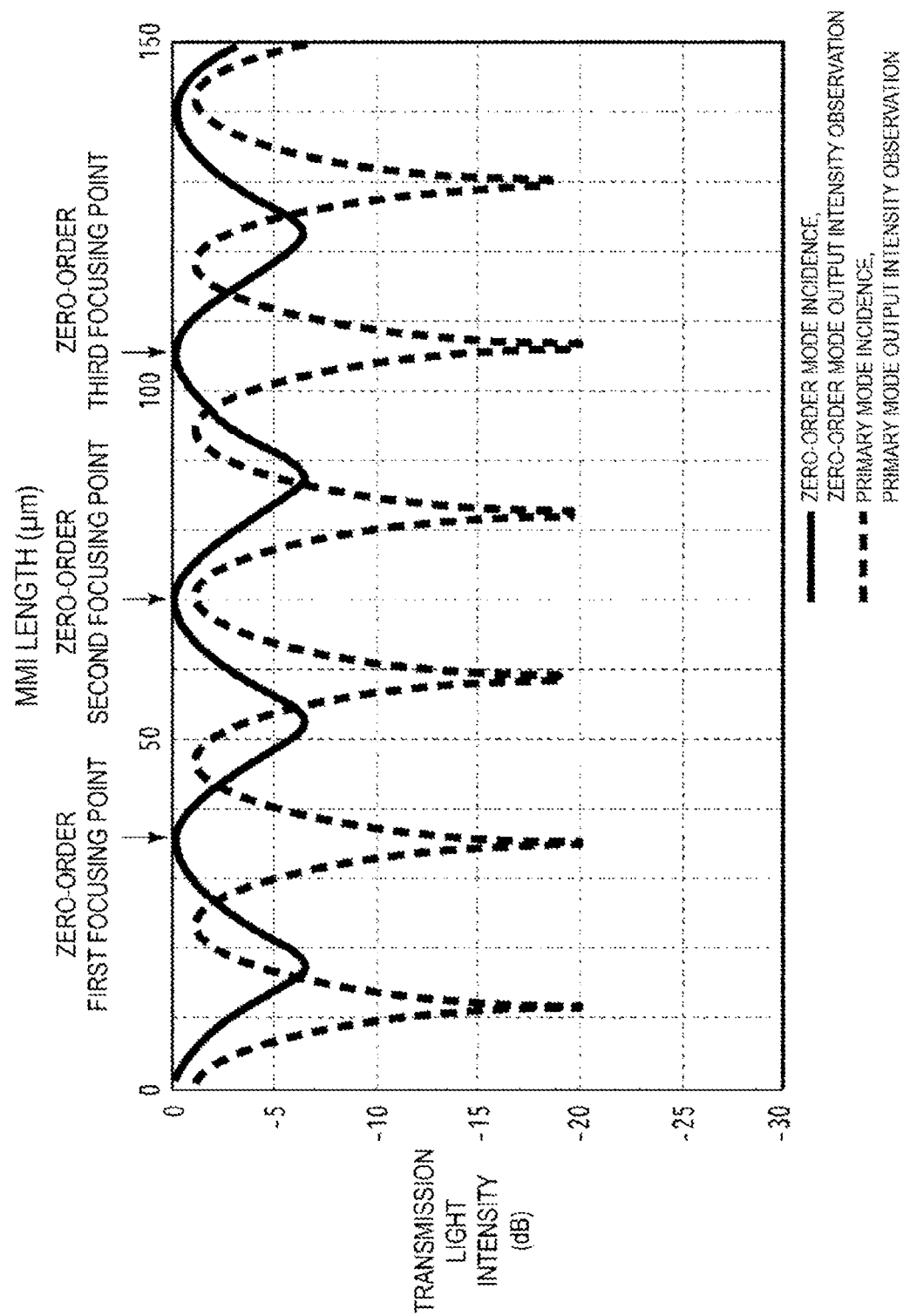
FIG. 13 is a diagram illustrating the relationship between an MMI length (horizontal axis) and a transmission light intensity (vertical axis) in a zero-order mode and a primary mode by using two graphs.

FIG. 13 illustrates the relationship, by using two graphs, between the transmission light intensity (dB) of MMI in the zero-order mode and the first-order mode (vertical axis) and the MMI length (μm) (horizontal axis).

Figure 14:
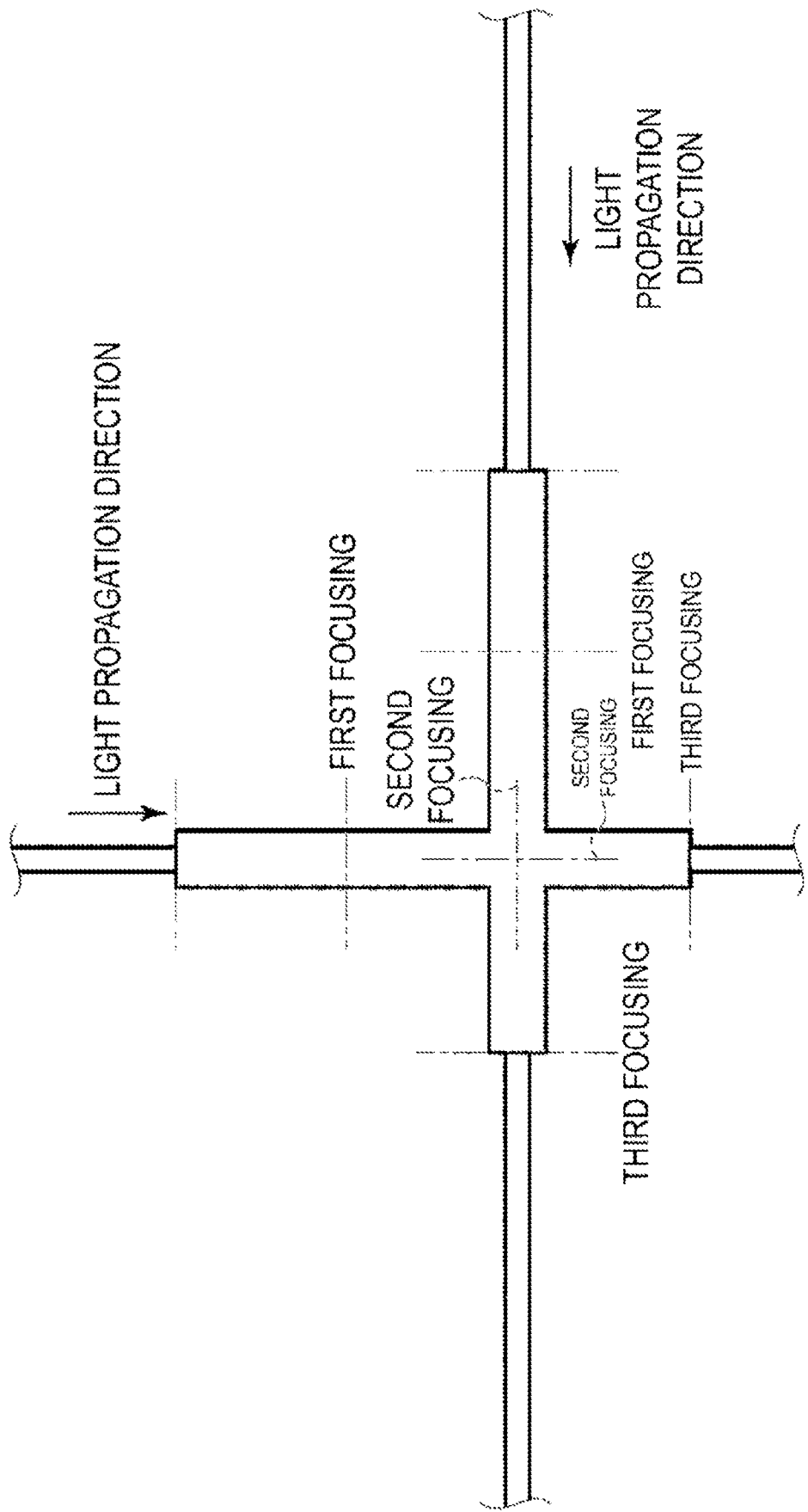
FIG. 14 is a chip plan view of the optical cross waveguide according to Example 6.

FIG. 14 is a chip plan view of the optical cross waveguide according to Example 6. The chip plan view illustrates the case where an optical cross waveguide is formed such that, for two lightwaves whose light propagation directions are horizontal and vertical, two MMI couplers are designed so that their third focusing points and MMI coupler lengths match, and the second focusing points are matched and intersected. With this configuration, in the optical cross waveguide, the loss reduction in the zero-order mode and the filter characteristics in the first-order mode can be achieved.

FIG. 15 is a chip plan view (a) of the optical cross waveguide according to Example 6, and a graph (b) showing the transmission light intensity. The graph (b) shows the transmission light intensity (dB) corresponding to the MMI length (μm) in the horizontal axis, when two MMI couplers are disposed by crossing the optical cross waveguides at the second focusing point. This is a result indicating that the transmission light intensity is greatest and the propagation loss becomes the smallest when light is focused at the second focusing position.

INDUSTRIAL APPLICABILITY

As described above, in the method for mounting an optical element according to the present disclosure, by using an optical cross waveguide in which lightwaves cross on the same plane, the characteristics of the optical element can be prevented from changing even when the optical element is warped under pressure or stress due to cooling or heating, and optical elements can be mounted in a simple manufacturing process.

REFERENCE SIGNS LIST

100, 200, 600, 700, 800, 900, 1000 IQ optical modulator
120, 220, 420a, 420b, 620, 720, 820, 920, 1020 Chip
101, 201 Input light
104X, 104Y, 204X, 204Y Nest-type MZM
602, 702X, 702Y, 802X, 802Y, 902X, 902Y Optical cross waveguide
902X', 902Y' Dummy optical cross waveguide
603, 803X, 903X First optical divider
606a, 606b, 806XI, 806XQ Second optical divider
604a, 604b, 704XI to YQ Optical modulation region
607a, 607b, 807XI, XQ First optical combiner
608a, 608b, 808XI, XQ, XIa to XQb DC Phase adjuster
609, 809X, Y Second optical combiner
102, 202, 402a, 402b, 601, 701, 801, 901 Input optical waveguide
103, 203, 403a, 403b Light branch circuit
490a, 490b Heat source
108, 208 RF modulation signal
110X, 110Y, 210X, 210Y Modulated output light
610, 710X, 710Y, 810X, 810Y, 910X, 910Y Output optical waveguide
730, 830, 930, 1030 XY polarization divider
1031 1-input 2-output optical divider
1032 DC phase adjuster
1033 2-input 2-output optical combiner/divider

The invention claimed is:

1. An IQ optical modulator, comprising a nest-type MZ optical waveguide including an I-channel optical modulation region and a Q-channel optical modulation region, wherein:
   an end portion of an input optical waveguide and an end portion of an output optical waveguide of the IQ optical modulator are located on a same edge face of a chip of the IQ optical modulator;
   a first optical combiner configured to combine output light from one channel of the I-channel optical modulation region and the Q-channel optical modulation region is provided;
   a second optical combiner connected to the output optical waveguide is provided;
   a connecting optical waveguide connecting the first optical combiner and the second optical combiner is provided;
   wherein the input optical waveguide and the connecting optical waveguide cross each other at an optical cross waveguide where light crosses on a same plane;
   a first optical divider connected to the input optical waveguide is provided between the I-channel optical modulation region and the Q-channel optical modulation region;
   and a light propagation direction in the first optical divider and a light propagation direction in the I-channel optical modulation region and the Q-channel optical modulation region are opposite to each other.

2. The IQ optical modulator according to claim 1, wherein a second optical divider configured to split light that has been divided by the first optical divider into two arms of the I-channel optical modulation region and the Q-channel optical modulation region is provided between the I-channel optical modulation region and the Q-channel optical modulation region, and
   a light propagation direction in the second optical divider and a light propagation direction in the I-channel optical modulation region and the Q-channel optical modulation region are opposite to each other.

3. The IQ optical modulator according to claim 1, wherein a dummy optical cross waveguide configured to supply no crossing light is provided on a side of another channel not crossing the input optical waveguide.

4. The IQ optical modulator according to claim 1, wherein the optical cross waveguide includes two 1×1 MMI couplers disposed in a cross shape in which a light propagation direction of the two couplers is orthogonal to each other.

5. The IQ optical modulator according to claim 4, wherein the two 1×1 MMI couplers cross at a second focusing point in a propagation mode of crossing light.

6. A polarization-multiplexed IQ optical modulator in which two IQ optical modulators according to claim 1 are integrated in parallel on a chip for an X-polarization channel and a Y-polarization channel, the polarization-multiplexed IQ optical modulator comprising
an XY polarization divider provided to divided light input from an input optical waveguide into an X-polarization channel and a Y-polarization channel to supply the divided light to two IQ optical modulators.

7. The polarization-multiplexed IQ optical modulator according to claim 6, wherein
the XY polarization divider includes a 1-input 2-output optical divider, a DC phase adjuster, and a 2-input 2-output optical combiner/divider.

\* \* \* \* \*